United States Patent [19]

Bykhovsky et al.

[11] 4,058,698

[45] Nov. 15, 1977

[54] METHOD AND APPARATUS FOR DC REVERSE POLARITY PLASMA-ARC WORKING OF ELECTRICALLY CONDUCTIVE MATERIALS

[76] Inventors: David Grigorievich Bykhovsky, Konjushenny pereulok, 1/6, kv. 18; Alexandr Ivanovich Danilov, Vasilievsky Ostrov, I6 linia, 79, kv. 15, both of Leningrad, U.S.S.R.

[21] Appl. No.: 627,035

[22] Filed: Oct. 30, 1975

Related U.S. Application Data

[63] Continuation of Ser. No. 457,206, April 2, 1974.

[51] Int. Cl.$^2$ .............................................. B23K 9/00
[52] U.S. Cl. ................................................. 219/121 P
[58] Field of Search ............... 219/121 P, 74, 75, 130; 313/231.3

[56] References Cited

U.S. PATENT DOCUMENTS

| | | | |
|---|---|---|---|
| 3,042,830 | 7/1962 | Orbach | 219/121 P X |
| 3,153,133 | 10/1964 | Ducati | 219/121 P |
| 3,272,962 | 9/1966 | Mauskapf | 219/121 P X |
| 3,304,774 | 2/1967 | Poole | 219/121 P X |
| 3,366,772 | 1/1968 | Wickham et al. | 219/121 P |
| 3,375,392 | 3/1968 | Brzozowski et al. | 219/121 P X |
| 3,450,926 | 6/1969 | Kiernan | 313/231.3 |
| 3,619,549 | 11/1971 | Hogan | 219/121 P |
| 3,641,308 | 2/1972 | Couch, Jr. et al. | 219/121 P |
| 3,790,742 | 2/1974 | Auer | 219/121 P |
| 3,928,745 | 12/1975 | Demars et al. | 219/121 P |

*Primary Examiner*—Bruce A. Reynolds
*Assistant Examiner*—Fred E. Bell

[57] ABSTRACT

A method of DC reverse polarity plasma-arc machining of electrically conductive materials with the aid of a plasmatron the plasmatron having a nonconsumable electrode with an insert made from a high-melting point material, the method being in that the material being machined is heated by the heat of an electric arc burning between the positive nonconsumable electrode of the plasmatron and the material being machined, with the supply of the plasma-forming gas, the intensity of the working current of the arc being selected such that its ratio to the diameter of the nozzle channel is within 50 to 100 A/mm on condition that at least a portion of the near-the-electrode zone of the arc is maintained in electric contact with the high-melting point insert of the electrode.

In an apparatus for plasma-arc machining of electrically conductive materials, the electrode of the plasmatron, with a nozzle arranged coaxially therewith, is coupled to the positive terminal of a power supply source, whose negative terminal is coupled to the material being worked, at least a portion of the end face surface of the electrode of the plasmatron being made from a high-melting point material, and the diameter of the electrode at least 1.1 times the diameter of the nozzle channel.

13 Claims, 1 Drawing Figure

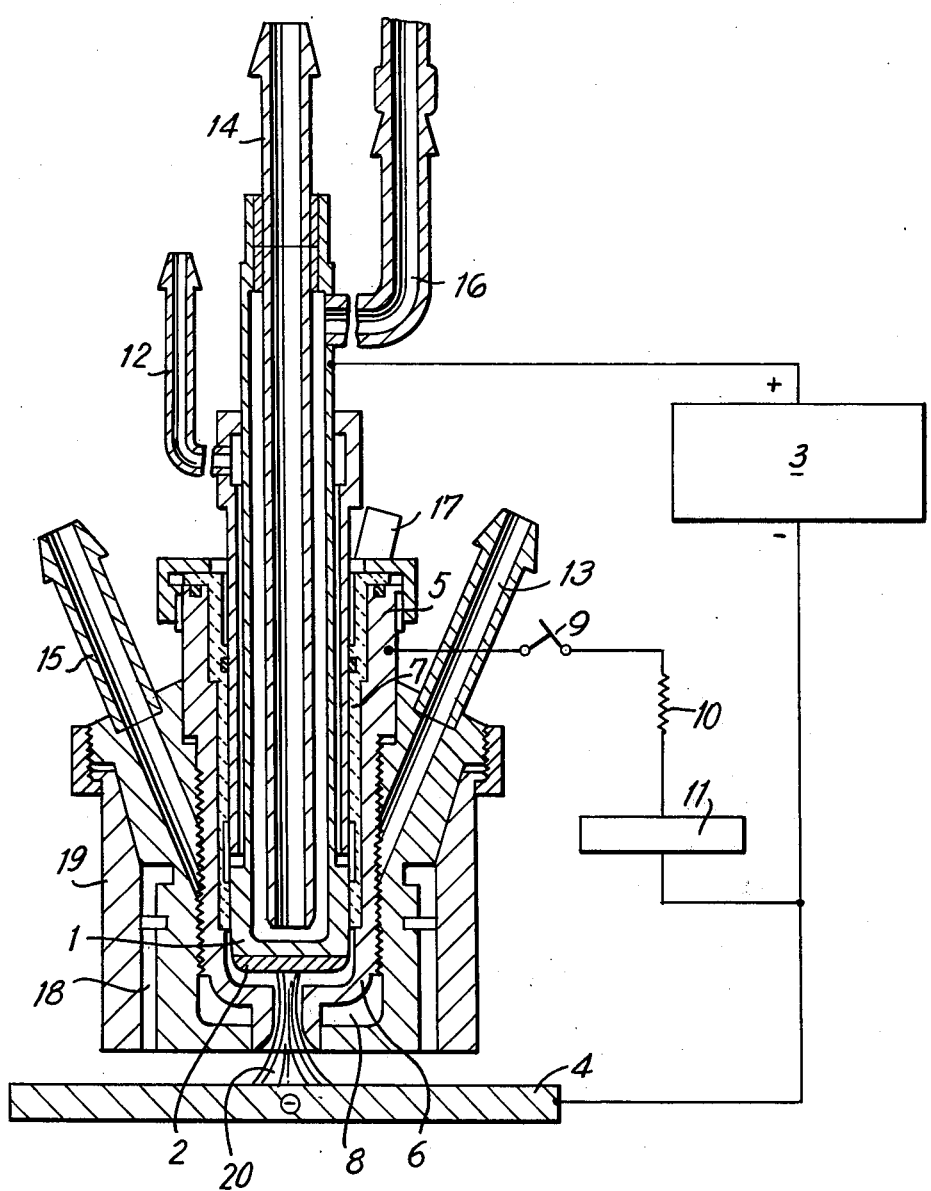

METHOD AND APPARATUS FOR DC REVERSE POLARITY PLASMA-ARC WORKING OF ELECTRICALLY CONDUCTIVE MATERIALS

This is a continuation of the parent application Ser. No. 457,206 filed Apr. 2, 1974.

BACKGROUND OF THE INVENTION

The present invention relates to plasma-arc machining of electrically conductive materials and more particularly to methods and apparatus for plasma-arc machining of materials. The method and apparatus of the present invention may find application in various branches of industry concerned with the manufacture of welded and clad structures.

In the present-day practice of manufacturing welded structures, particularly from aluminium and its alloys, shielded and submerged DC and AC arc welding with a consumable and nonconsumable electrode is employed.

A general disadvantage of the AC arc welding with a nonconsumable electrode are the limited technological possibilities of such a procedure as to the thickness of parts that can be welded together without veeing (V-shaped configuration). An attempt to remedy these limitations by resorting to heavy-current AC arcs leads to an increase of tungsten inclusions, oxide films and porosity in the weld metal.

A disadvantage of shielded arc welding with a consumable electrode are the limited technological possibilities offered by single-pass one-side welding, while submerged arc welding with a consumable electrode is disadvantageous in view of poor sanitary working conditions. Welds made by the shielded arc techniques with the use of a consumable electrode are characterized by the presence of pores and oxide inclusions, while welds made by the submerged arc procedure and with the use of a consumable electrode display slag inclusions and low stability against corrosion. Moreover, this method of welding is associated with an extremely high consumption of welding wire.

The method of DC reverse polarity plasma-arc welding, despite its numerous advantages, so far has found little industrial application.

There is already known in the art a method of DC reverse polarity plasma-arc welding of aluminium sheets having a thickness of 250" (0.635 cm) (see, e.g. Cathodic Cleaning and Plasma-Arc Welding of Aluminum. Welding Journal No. 5, 1968).

This known method of DC reverse polarity plasma-arc welding was used on equipment designed for plasma cutting and sputtering, depending on the configuration of the nozzle-electrode. The set of equipment, besides a modified 50 kW universal plasma torch, also included monitoring equipment adapted to control voltage and current intensity of the arc, as well as the flow of plasm-forming and shielding gases. The plasma arc was powered by two series-connected DC rectifiers with a no-load voltage of 140 to 150 V.

For a better dissipation of heat, a copper water-cooled electrode was used instead of a tungsten one.

The shielding and plasma-forming gas was either argon or a mixture of argon and helium.

The attained rates of plasma arc-welding were equal to or somewhat exceeded those attainable with other methods of welding. Maximum thickness of aluminium welded by DC reverse polarity plasma-arc welding per pass without veeing was 0.250" (0.635 cm).

Further developments of the method of DC reverse polarity plasma-arc welding are reported (see, e.g. the publication "Plasma-Arc Welding of Aluminum" in "Keikinzoku Yosetsu", 9, No. 98, 1971); this method was employed for welding aluminuim sheets whose maximum thickness was 6 mm.

In this known method, the electrode of the plasmatron is coupled to the positive terminal of the DC power supply source with a view to ensuring heat dissipation, the positive electrode in the plasmatron is made of copper, with the end face in its working portion shaped as a frustum of a cone (the diameter of the top surface area being about 2 mm).

The process of DC reverse polarity plasma-arc welding is working as follows. Simultaneously with feeding working and shielding gases and water for cooling the positive electrode and the nozzle, a high-frequency current discharge is passed to initiate the pilot arc. Then a flash of plasma emitting from the nozzle is produced by the pilot arc, and a main plasma-arc is ignited between the positive copper electrode and the plate to be machined, provided with output straps. The pilot arc is quenched, the plasmatron is moved to the required position, and welding is started.

The above-considered methods of DC reverse polarity plasma-arc welding are not free from a number of essential disadvantages: the main disadvantages are as follows:

a. noncompetitiveness with other types of arc welding;
b. lower permissible values of working currents;
c. restricted ranges or permissible working conditions;
d. limitations to the thickness of welded sheets;
e. necessity of using power supply sources with a no-load voltage of 140 to 150 V while welding sheets having a thickness from 0.6 to 6.0 mm, the intensity of working currents reaching 200 A;
f. possibility of the weld metal being contaminated with the anode material (copper).

At present, clad structures are manufactured through the use of arc processes, namely, by surfacing with a strip electrode, by shielded and submerged surfacing with a consumable electrode, as well as by plasma-arc surfacing with a solid wire electrode, with a wire tube electrode, and with powders.

A disadvantage common to and characteristic of all the methods of arc surfacing is a high degree of melting of the back-up material. The methods of surfacing are noted for their sufficiently high efficiency; however, the required degree of melting can be ensured only if the thickness of the built-up layer is much greater than that needed in the finished product. The necessity of subsequent finishing, naturally, brings down the efficiency of the surfacing procedure in terms of the product.

Various known methods of plasma-arc surfacing (see, e.g. Plasma-Arc-Hot-Wire Surfacing - A New High Deposition Process Welding Journal No. 5, 1969 and Plasmennaya naplavka metallov (Plasma-arc Surfacing of Metals), "Mashinostroyeniye", Leningrad, 1969) fail to eliminate melting of the back-up material.

With the use of the known plasma-arc surfacing methods on an industrial scale, the degree of melting reaches 5 to 10 percent, depending on the current magnitude and the built-up material.

It is an object of the present invention to eliminate the above-mentioned disadvantages.

Another object of the invention is to provide a method of DC reverse polarity plasma-arc machining which will include plasma-arc welding and plasma-arc surfacing.

A further object of the invention is to provide apparatus for effecting DC reverse polarity plasma-arc machining.

Still another object of the invention is to provide universal equipment of the type described.

SUMMARY OF THE INVENTION

The objects are accomplished by a method of DC reverse polarity plasma-arc machining of electrically conductive materials, wherein the material to be machining is heated by the heat of an electric arc burning between the positive nonconsumable electrode of a plasmatron and the machined material with the supply of a plasma-forming gas, according to the invention, the process of machining is conducted with the use of an electrode having an insert made from a high-point metal and with the intensity of the working current of the arc such that its ratio to the diameter of the nozzle channel lies within 50 to 100 A/mm, at least a portion of the near-the-electrode zone of the arc being kept in electric contact with the high-melting point insert of the electrode.

It is expedient that the ratio of the current intensity the near-the-electrode zone of the arc to the diameter of the near-the-electrode zone of the arc should be at least 1.1 times smaller than the ratio of the current intensity to the diameter of the nozzle channel.

Moreover, when using the herein-proposed method of DC reverse polarity plasma-arc machining of electrically conductive materials for welding, it is expedient that the ratio of the current intensity to the diameter of the channel of the nozzle be kept within 60 to 100 A/mm, while when using this method for surfacing the respective FIGURE should be within 50 to 70 A/mm.

When machining electrically conductive materials in a controlled medium, it is recommendable that as a plasma-forming gas use should be made of a gas or gas mixtures identical to the controlled medium; when working electrically conductive materials without shielding the arc, it is that the heating zone of the electrically conductive material being machined be supplied with an additional flow of gas.

When welding and surfacing, an inert gas can be used as a plasma-forming gas and as an agent for creating an additional gas flow. When welding and surfacing, for creating an additional gas flow it is likewise possible to employ active gases or mixtures of active and inert gases. When working electrically conductive materials, it is also possible to use inert gases for plasma-forming, and a mixture of an inert and an active gas for creating an additional gas flow.

In an apparatus for implementing the present method of plasma-arc machining of electrically conductive materials, comprising a plasmatron with a nonconsumable electrode coupled to the positive terminal of a DC source whose second terminal is coupled to the material being machined, wherein the plasmatron has a channel for feeding a plasma-forming gas and a nozzle with a channel, it is expedient that at least a portion of the end face surface of the electrode be made from a highmelting point metal and the diameter of the electrode exceed by at least 1.1 times that of the nozzle channel. As an inert at the end face of the electrode such high-melting point materials as tungsten add its alloys can be used.

The herein-proposed method and apparatus for DC reverse polarity plasma-arc welding ensure a much better quality of welded joints. Then, all methods of fusion welding, in practically any range of working currents, higher efficiency as compared to conventional methods of fusion arc welding, as well as maximum reliability and convenience in operation.

High quality of welds is ensured by constant removal of oxide films from welded edges and welding metal by cathodic sputtering, by high stability of the process, and by favorable distribution of the B — phase when welding aluminum-magnesium alloys.

High efficiency of the welding process is ensured by the possibility of introducing into the weld pool of considerable power without disturbing the process. In this connection welding can be performed without veeing with a high efficiency, the thickness of worked sheets reaching 30 mm.

The possibility of adjusting the heat flux density within a wide range of working currents leads to the feasibility of surface remelting or application of cladding layers without melting of the back-up material.

The convenience of operation and reliability of the process and apparatus stem from the use of direct current, a relatively large arc gap, simplicity of the control circuits and equipment, the possibility of programming and automation, together with adequate sanitary working conditions.

The advantage of DC reverse polarity plasma-arc surfacing is the possibility of building-up the cladding layer without melting of the back-up material. Bonding of the cladding layer with the back-up material is achieved by removing solute phases from contacting surfaces by cathodic sputtering. The obtaining of surfaces free from solute phases leads to an increase in the width of surfacing and, hence, to the possibility of applying thin coats, which rules out the necessity of mechanisms performing oscillatory motions for increasing the width of surfacing.

Running of the process without melting of the base metal and welding wire results in surface machining being performed by cathodic sputtering. In case of DC reverse polarity plasma-arc welding and surfacing the process of cathodic cleaning is combined with the main process.

The process of plasma-arc working of electrically conductive materials is universal not only from the standpoint of the technological possibilities it offers, but also from the standpoint of utilization of the equipment.

Practically all processes can be effected with the use of the same power supply sources, control circuits and plasmatrons.

BRIEF DESCRIPTION OF THE DRAWING

For a better understanding of the present invention, a detailed description of its possible embodiments is given hereinbelow by way of illustration, with due reference to the accompanying drawings in which:

FIG. 1 shows a sectional view of the herein-proposed apparatus for effecting plasma-arc machining of electrically conducting materials; and FIG. 2 is a sectional view of the apparatus similar to FIG. 1 with the exception of the size of the high-melting insert.

DESCRIPTION OF THE PREFERRED EMBODIMENT

The present method of DC reverse polarity plasma-arc machining of electrically conductive materials resides in the following. A nonconsumable electrode 1 (FIG. 1) with an insert 2 made from a high-melting point material is coupled to the positive terminal of a DC source 3. The negative terminal of the source 3 is coupled to electrically conductive material 4 to be machined. The positive electrode 1 with the insert 2 made from a highmelting point metal, comprised in a plasmatron 5, is electrically insulated from a nozzle 6 by an insulation sleeve 7. The nozzle 6 with a central channel 8, which is a means for stabilizing the burning arc, is coupled to the negative terminal of the DC source 3 through a toggle switch 9, a resistor 10 and a highvoltage discharger 11 which is a means for initiating an electric arc, all these elements being connected in series. Through a channel 12 a plasma-forming gas is supplied to the plasmatron 5. A cooling agent is fed to the plasmatron 5 through channels 13 and 14; discharge of the cooling agent from the plasmatron 5 takes place through channels 15 and 16. If required, a gas is supplied into the plasmatron 5 through a channel 17, this gas creating an additional gas flow in a space 18 defined by the nozzle 6 and a protecting nozzle 19. Concurrently with the feeding of the plasma-forming gas through the channel 12 and of the cooling agent through the channels 13 and 14, a high-voltage discharge is passed through a gap between the positive electrode 1 with the high-melting point metal insert 2 and the nozzle 6 of the plasmatron 5, this highvoltage discharge initiating a pilot arc. The ionized gas flow created by the pilot arc initiates an electric arc 20 on contacting the electrically conductive material 4. After striking of the arc 20, the electric circuit between the nozzle 6 and the negative terminal of the DC source 3, composed of the series-connected toggle switch 9, resistor 10 and highvoltage discharger 11, is interrupted either with the aid of the toggle switch 9 or automatically.

During the working process the near-the-electrode zone or the arc 20 is found partially or fully in electric contact with the high-melting point metal insert 2, on condition that the diameter of the high-melting insert 2 is considerably smaller than the diameter of the channel of the nozzle 6, and the diameter of the end face surface of the non-consumable positive electrode 1 is at least 1.1 times the diameter of the channel of the nozzle 6, (FIG. 2) while the ratio of the working current of the arc to the diameter of the channel of the nozzle 6 ranges from 50 to 100 A/mm. The near-the-electrode zone of the electric arc 20 is fully in electric contact with the high-melting point metal insert 2 during the working process, when the diameter of the insert 2 is equal to that of the end face surface of the positive electrode 1, (FIG. 1) and the ratio of the working current of the arc to the diameter of the nozzle channel lies within 50 to 100 A/mm.

In the latter case, any contamination by vapors of the material from the end face surface of the positive electrode is excluded.

The material for the high-melting point insert 2 is made of tungsten and tungsten-base alloys. Other suitable highmelting materials can be molybdenum, tantalum, and hafnium.

Depending on the particular kind of the DC reverse polarity plasma-arc working process, it is conducted with such intensities of the working current, that its ratio to the diameter of the channel of the nozzle 6 lies within 50 to 100 A/mm.

When the method of DC reverse polarity plasma-arc machining of electrically conductive materials is employed for welding, the process is conducted with such an intensity of the working current of the arc 20, that its ratio to the diameter of the central channel 8 of the nozzle 8 lies within 60 to 100 A/mm.

When the method of DC reverse polarity plasma-arc machining of electrically conductive materials is employed for surface remelting, surfacing, and cathodic cleaning, the process is conducted with such an intensity of the working current of the arc 20, that the ratio of the working current intensity to the diameter of the central channel of the nozzle 6 ranges from 50 to 70 A/mm.

The present method of DC reverse polarity plasma-arc machining of electrically conductive materials will now be considered in connection with its embodiments.

EXAMPLE 1

Single-pass one-side welding of a butt joint is performed without veeing (V-shaped configuration), without shielding, using inert gases for plasma-forming and creating an additional gas flow, and with the feed of welding wire. The diameter of the welding wire is 2.5 mm. The thickness of the basic metal is 20 mm. The composition of the basic and welding metals, in percent by weight, is as follows:

Al, 92
Mg, 6.5
Mn, 0.5
Si, 0.4
Cu, 0.1

The diameter of the channel of the nozzle 6 is 7.5 mm. The diameter of the nonconsumable electrode 1 (of its end face surface) is 20 mm. The diameter of the insert 2 made from tungsten is 5 mm. Welding is performed under the following conditions: working current, 600 A; arc voltage, 45 V; consumption of argon used as a plasma-forming gas, 85 lit. per hour; welding rate, 8 meters per hour.

The ratio of the working current intensity to the diameter of the central channel 8 of the nozzle 6 is 80 A/mm, the diameter of the near-the-electrode zone of the arc is 1.3 times the diameter of the central channel 8 of the nozzle, the ratio of the diameter of the nonconsumable electrode 1 to the diameter of the central channel of the nozzle 6 is 2.6, and a portion of the near-the-electrode zone of the arc is kept in electric contact with the insert.

EXAMPLE 2

Single-pass one-side welding of a butt joint is performed without veeing, without shielding, using inert gases for plasma-forming and creating an additional gas flow, and with the feed of welding wire. The thickness of the basic metal is 8 mm. The diameter of the welding wire is 2.5 mm. The composition of the basic and welding metals, in percent by weight, is as follows:

Al, 92
Mg, 6.5
Mn, 0.5
Si, 0.4
Cu, 0.1

The diameter of the nozzle 6 is 3 mm. The diameter of the end face surface of the nonconsumable electrode 1 is 10 mm. The diameter of the insert 2 is 2 mm. The insert 2 is made of a material whose composition is 97% W and 3% I.

Welding is done under the following conditions: working current, 300 A; working voltage, 37 V; consumption of the plasmaforming gas (argon), 60 lit. per hour; consumption of gas (argon) for the creation of the additional gas flow, 1500 lit. per hour; welding rate, 18 meters per hour.

The ratio of the working current intensity to the diameter of the central channel 8 in the nozzle 6 is 100 A/mm, the diameter of the near-the-electrode zone of the arc is 1.1 times the diameter of the central channel 8 of the nozzle 6 the ratio of the diameter of the non-consumable electrode 1 to the diameter of the central channel 8 of the nozzle 6 is 3.3, and a portion of the near-the-electrode zone of the arc is kept in electric contact with the insert 2.

EXAMPLE 3

Single-pass one-side welding of a butt joint is performed without veeing, without shielding, using an inert plasma-forming gas and a mixture of an active gas and an inert gas for creating an additional gas flow.

The thickness of the basic metal is 25 mm. The diameter of the welding wire is 3 mm. The composition of the basic and welding metals, in percent by weight, is as follows:

Al, 99.3
Fe, 0.3
Si, 0.35
Cu, 0.05

The diameter of the central channel 8 of the nozzle 6 is 10 mm. The diameter of the nonconsumable electrode 1 (of its end face surface) is 20 mm. The diameter of the insert 2 is 6 mm. The material of the insert 2 is 98% W and 2% La. Welding is done under the following conditions: working current, 600 A; arc voltage, 43 V; consumption of the plasma-forming gas (argon), 90 lit. per hour; consumption of argon and oxygen in the gas mixture for creating the additional gas flow, 1782 and 18 lit. per hour respectively; welding rate, 10 meters per hour.

The ratio of the working current to the diameter of the central channel of the nozzle 6 is 60 A/mm, the diameter of the near-the-electrode zone of the arc is 1.3 times the diameter of the central channel 8 of the nozzle 6, the ratio of the diameter of the nonconsumable electrode 1 to the diameter of the central channel 8 of the nozzle 6 is 2.6, and a portion of the near-the-electrode zone of the arc is kept in electric contact with the insert 2.

EXAMPLE 4

Single-pass one-side welding of a butt joint is performed without veeing, without shielding, with the use of an inert gas as the plasma-forming gas and of an active gas for creating an additional gas flow.

The thickness of the basic metal is 4 mm. The diameter of welding wire is 1.6 mm. The composition of the basic metal, in percent by weight, is:

C, 0.1
Si, 0.5
Mn, 1.5
Cr, 18
Ni, 10
Ti, 0.1
Fe, 68.9

The composition of the welding metal, in percent by weight, is:
C, 0.08
Si, 1.0
Mn, 1.0
Cr, 20
Ni, 10
Ti, 1.0
Fe, 66.0

The diameter of the nozzle 6 is 3 mm. The diameter of the end face surface of the nonconsumable electrode 1 is 10 mm. The diameter of the insert 2 is 10 mm. The material of the insert 2 is 97.5% W and 2.5 I. Welding is done under the following conditions: working current, 300 A; working voltage 30 V; consumption of the plasma-forming gas (argon), 40 lit. per hour; consumption of carbon dioxide gas for creating an additional gas flow, 800 lit. per hour; welding rate, 30 meters per hour. The near-the-electrode zone of the arc is kept fully in electric contact with the high-melting point insert 2.

EXAMPLE 5

Building-up of a cladding layer without shielding was performed with the use of inert gases for plasma-forming and creating an additional gas flow, and with the employment of welding wire. The diameter of the welding wire is 2 mm. The composition of the backing-up, in percent by weight, is:

C, 0.22
Si, 0.3
Mn, 0.4
Fe, 99.0

The composition of the welding wire, in wt.%, is:
Cu, 96
Mn, 1.0
Si, 3.0

The diameter of the central channel 8 of the nozzle 6 is 7 mm. The diameter of the end face surface of the nonconsumable electrode 1 is 10 mm. The diameter of the insert 2 made from tungsten is 4 mm.

The surfacing is carried out under the following conditions: working current, 350 A; working voltage, 45 V; consumption of the plasma-forming gas (argon), 180 lit. per hour; consumption of argon for the creation of the additional gas flow, 800 lit. per hour; the ratio of the working current intensity to the diameter of the central channel 8 of the nozzle 6, 50 A/mm; the diameter of the near-the-electrode zone of the arc is 1.1 times the diameter of the central; channel 8 of the nozzle 6; the ratio of the diameter of the nonconsumable electrode 1 to the diameter of the central channel 8 of the nozzle 6 is 1.4; and a portion of the near-the-electrode zone of the arc is kept in electric contact with the insert 2.

EXAMPLE 6

Building-up of a cladding layer was performed without shielding, with the use of inert gases for plasma-forming and creating an additional gas flow, and with the use of welding wire. The diameter of the welding wire is 2.5 mm. The composition of the backing-up, in percent by weight, is:

Si, 2.5
Mn, 0.5
Cu, 97

The composition of the welding wire, in wt.%, is:
Cu, 93
Sn, 6.6
P, 0.4

The diameter of the central channel 8 of the nozzle 6 is 6 mm. The diameter of the end face surface of the nonconsumable electrode 1 is 10 mm. The diameter of the insert 2 is 3 mm. The material of the insert 2 is 97% W and 3% Y. The conditions of surfacing were as follows: working current, 420 A; working voltage, 47 V; consumption of the plasma-forming gas (argon) 170 lit. per hour; consumption of argon for creating the additional gas flow, 900 lit. per hour; the ratio of the working current intensity to the diameter of the central channel 8 of the nozzle 6 is 70 A/mm; the diameter of the near-the-electrode zone of the arc is 1.2 times that of the central channel 8 of the nozzle 6; the ratio of the diameter of the nonconsumable electrode 1 to the diameter of the central channel 8 of the nozzle 6 is 1.7; and a portion of the near-the-electrode zone of the arc is kept in electric contact with the insert 2.

EXAMPLE 7

Building-up of a cladding layer is performed without shielding, with the use of an inert plasma-forming gas, with the use of an active gas for creating an additional gas flow, and with feeding welding wire. The diameter of the welding wire is 1.6 mm. The composition of the backing-up, in percent by weight, is
C, 0.22
Si, 0.3
Mn, 0.4
Cu, 99.0
The composition of the welding wire, in percent by weight, is:
C, 0.08
Si, 1.0
Mn, 1.0
Cr, 20
Ni, 10
Ti, 1.0
Fe, 66.0

The diameter of the nozzle 6 is 5 mm. The diameter of the end face surface of the nonconsumable electrode 1 is 10 mm. The diameter of the insert 2 is 10 mm. The material of the insert 2 is 97.5% W and 2.5% Y. The conditions of the surfacing were as follows: working current, 300 A; working voltage, 31 V consumption of the plasma-forming gas (argon), 160 lit. per hour; consumption of carbon dioxide gas for creating the additional gas flow, 800 lit. per hour. The ratio of the working current intensity to the diameter of the central channel 8 of the nozzle 6 is 60 A/mm, the diameter of the near-the-electrode zone of the arc is 1.25 times that of the central channel 8 of the nozzle 6, the ratio of the diameter of the non-consumable electrode 1 to the diameter of the central channel 8 of the nozzle 6 is 2, and the near-the-electrode zone of the arc is kept in electric contact with the high-melting point insert 2.

EXAMPLE 8

Building-up of a cladding layer is done without shielding, with the use of an inert gas for plasma-forming and of a mixture of an inert and an active gas for creating an additional gas flow; feeding of welding wire is employed. The composition of the back-up material, in percent by weight, is:
C, 0.20
Si, 0.3
Mn, 0.4
Fe, 99.0

The composition of the welding wire, in percent by weight, is:
C, 0.08
Si, 1.0
Mn, 1.0
Cr, 20
Ni, 10
Ti, 1.0
Fe, 66.0
The diameter of the nozzle 6 is 6 mm. The diameter of the end face surface of the nonconsumable electrode 1 is 10 mm. The diameter of the insert 2 is 10 mm. The material of the insert 2 is 97% W and 3% La. The conditions of surfacing were as follows: working current, 420 A; working voltage, 40 V; consumption of the plasma-forming gas (argon), 170 lit. per hour; consumption of argon and carbon dioxide gas in the mixture for creating the additional gas flow, 20 and 1780 lit. per hour, respectively.

EXAMPLE 9

Surface remelting in a controlled medium with the use of an identical medium as a plasma-forming gas and without welding wire. The controlled medium is argon. The composition of the material subjected to remelting is as follows (in percent by weight)
Ti, 90
Al, 7
Mo, 2
Cr, 1.0
The diameter of the central channel 8 of the nozzle 6 is 10 mm. The diameter of the end face surface of the nonconsumable electrode 1 is 18 mm. The diameter of the insert 2 is 18 mm. The material of the insert 2 is 97% W and 3% La. The conditions of remelting are as follows: working current, 500 A; working voltage, 60 V; consumption of the plasma-forming gas (argon), 400 lit. per hour.

EXAMPLE 10

Surface remelting is performed in a controlled medium with the use of a mixture of gases identical to the controlled medium as the plasma-forming gas, without welding wire.
The composition of the controlled medium is argon and helium. The composition of the material subjected to remelting is as follows (in percent by weight):
Ti, 90
Al, 7.0
Mo, 2.0
Cr, 1.0
The diameter of the central channel 8 of the nozzle 6 is 10 mm. The diameter of the end face surface of the nonconsumable electrode 1 is 18 mm. The diameter of the insert 2 is 18 mm. The material of the insert 2 is 97% W and 3% Y. Remelting is done under the following conditions: working current, 500 A; working voltage, 70 V; consumption of argon and helium as the plasmaforming gases is 400 and 600 lit. per hour, respectively.

EXAMPLE 11

Single-pass one-side welding of a butt joint is conducted without veeing, without shielding, with the use of inert gases for plasma-forming and for creating an additional gas flow. The thickness of metal is 30 mm. The composition of the basic metal and welding wire, in percent by weight, is:

Al, 99.3
Si, 0.35
Fe, 0.3
Cu, 0.05

The diameter of the central channel 8 of the nozzle 6 is 13 mm. The diameter of the end face surface of the nonconsumable electrode 1 is 25 mm. The diameter of the insert 2 is 20 mm. The material of the insert 2 is 98% W and 2% La. The conditions of welding are as follows: working current, 1000 A working voltage 60 V; consumption of the plasma-forming gas (argon), 90 lit. per hour; consumption of helium for creating the additional gas flow, 1600 lit. per hour; welding rate, 12 meters per hour. The near-the-electrode zone of the arc is kept fully in electric contact with the insert 2.

Thus, plasma-arc machining of electrically conductive materials can be carried out under various conditions, with various combinations of the plasma-forming and shielding gases, the process being noted for a high quality of machining and high efficiency.

What is claimed is:

1. A method of DC reverse polarity plasma-arc working of electrically conductive materials with the aid of a plasmatron, with a non-consumable electrode having an insert of high-melting material, said method comprising the steps of: coupling the non-consumable electrode of a positive terminal of a DC source; coupling another terminal of the DC source to the material being worked; coupling said other terminal of the DC source via a resistor to the cylindrical channel of a nozzle of the plasmatron; feeding a plasmaforming gas and a cooling agent into the plasmatron; striking a pilot electric arc between the non-consumable electrode and said nozzle of the plasmatron; striking a main arc between the non-consumable electrode and the material to be worked with a simultaneous quenching of the pilot arc; adjusting the operating current, the composition and consumption of the plasmaforming gas so that during the working process the zone of the anode arc near-the-electrode is greater than the diameter of the cylindrical portion of the nozzle channel; and placing at least a portion of the zone of the arc near-the-electrode in electric contact with said high-melting insert of the electrode.

2. A method of plasma-arc working of electrically conductive materials according to claim 1, including the step of adjusting the ratio of the current intensity to the diameter of the nozzle channel within 60 to 100 A/mm when welding an electrically conductive material.

3. A method of plasma-arc working of electrically conductive materials according to claim 1, including the step of adjusting the ratio of the current intensity to the diameter of the nozzle channel within 50 to 70 A/mm when surfacing an electrically conductive material.

4. A method of plasma-arc working of electrically conductive materials as of claim 1, including the step of working electrically conductive materials in a controlled medium comprising a plasma-forming gas identical to the controlled medium.

5. A method of plasma-arc working of electrically conductive materials as of claim 1, including the step of working electrically conductive materials without shielding and blowing on the heating zone of the electrically conductive material being blown by an additional gas flow.

6. A method as defined in claim 1, wherein the high melting point metal at the end face of said non-consumable electrode comprises tungsten and its alloys.

7. A method of plasma-arc working of electrically conductive materials as claimed in claim 5, including the step of using an inert gas selected from the group consisting of argon and helium for plasma formation and creating an additional gas flow.

8. A method of plasma-arc working of electrically conductive materials as claimed in claim 5, including the step of using argon as the inert gas for plasma formation and additional blasting in plasma-arc surfacing.

9. A method of plasma-arc working of electrically conductive materials as claimed in claim 5, including the step of using carbon dioxide as the gas for additional blasting in plasma-arc welding.

10. A method of plasma-arc working of electrically conductive materials as claimed in claim 5, including the step of using carbon dioxide as the gas for additional blasting in plasma-arc surfacing.

11. A method of plasma-arc working of electrically conductive materials as claimed in claim 5, including the step of using a mixture of argon and carbon dioxide for additional blasting in plasma-arc welding.

12. A method of plasma-arc working of electrically conductive materials as claimed in claim 5, including the step of using a mixture of argon and carbon dioxide for additional blasting in plasma-arc surfacing.

13. A method as defined in claim 1 including the steps of: adjusting the ratio of the current intensity to the diameter of the nozzle channel within 60 to 100 A/mm when welding an electrically conductive material; working electrically conductive materials without shielding and blowing an additional gas flow through the heating zone of the electrically conductive material; using an inert gas comprising argon for plasma formation and creating an additional gas flow; and using tungsten at the end phase of said non-consumable electrode.

* * * * *